Dec. 17, 1935.   M. H. PROSPERI   2,024,874
X-RAY PHOTOGRAPHY
Filed Feb. 26, 1935   2 Sheets-Sheet 1
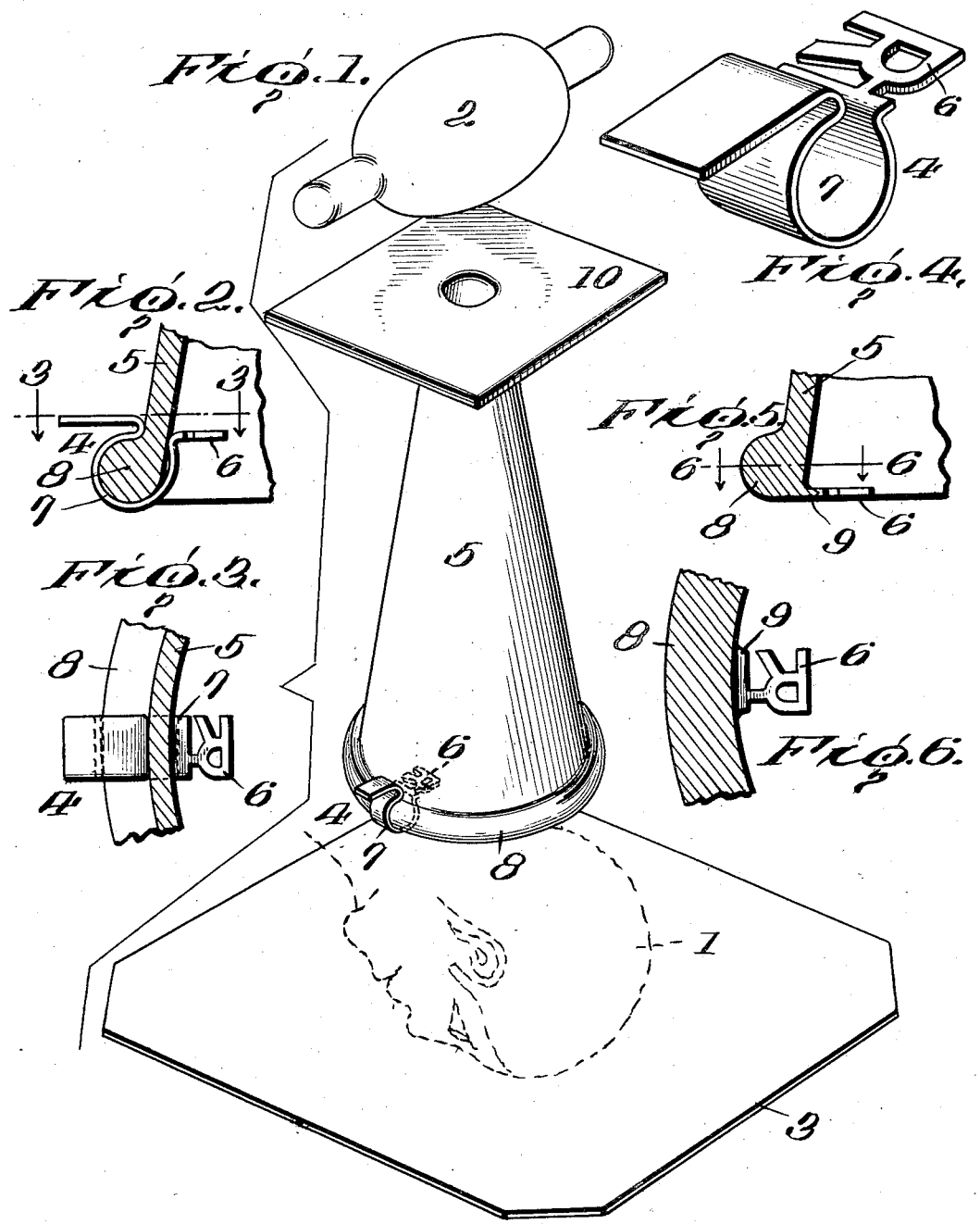
Inventor
MILTON H. PROSPERI.

Dec. 17, 1935.    M. H. PROSPERI    2,024,874
X-RAY PHOTOGRAPHY
Filed Feb. 26, 1935    2 Sheets—Sheet 2
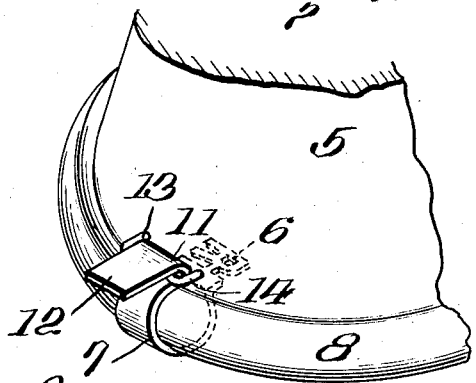
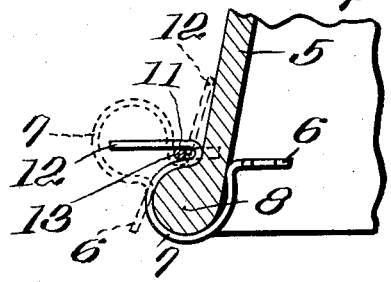
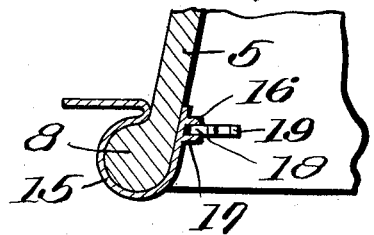
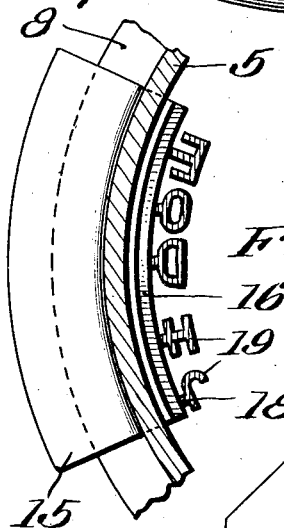
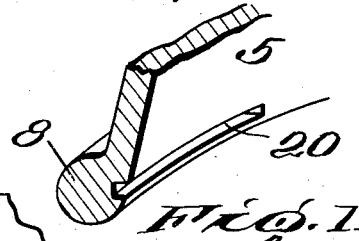
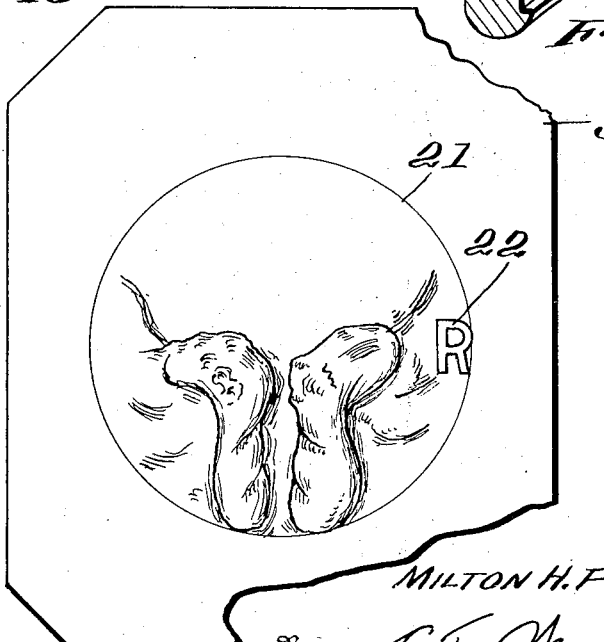
Inventor
MILTON H. PROSPERI.
By E. F. Newdroth
Attorney Patented Dec. 17, 1935

2,024,874

UNITED STATES PATENT OFFICE 2,024,874

X-RAY PHOTOGRAPHY

Milton H. Prosperi, Washington, D. C.

Application February 26, 1935, Serial No. 8,336

10 Claims. (Cl. 250—34)

My invention relates to the art of X-ray photography and more particularly concerns a method and means for making an X-ray plate so that its proper orientation for the purpose of reading is always assured.

Previous efforts along such lines have in the most part been directed to the small, dental X-ray films. So far as I know, in all previous attempts, a marking indicia has been placed on X-ray film pack or cassette itself, prior to exposure, so that the marker is on the far side of the object being photographed from the X-ray tube. Among other disadvantages two principal drawbacks inherent with this technique immediately suggest themselves. The first one of these is that, when a large picture is being taken, use being made of the usual compression cone for delimiting the area to be exposed to the rays, the circular exposed area of the substantially rectangular film is well within the margins of the latter, so that a marker disposed near the margins of the film may quite possibly not be exposed to the beam of X-rays, and will not show up in the unexposed portions of the developed film. The second of these two major drawbacks is that even if the marker is properly disposed on the film pack so that it will be irradiated by the X-ray beam, it is only the orientation of the film which is definitely fixed, and not the object which is to be photographed. That this is so is evident from a consideration of the following: Assume that the marker is placed on the film carrier, and is so disposed with respect to its margins that it will intercept the path of the X-rays. This marker will then, if it is even slightly eccentric to the center of the film, indicate a right and left side thereto, properly and uniquely orienting the sides of the film with respect to the center. However, such disposition of the marker on the cassette will not prevent reversing the position of the cassette when slipping the same into its carrier; so that while in either case, the proper orientation of the sides of the film with respect to its center is still determinable, it is impossible to discover without more, exactly what was the orientation of the article being photographed, with respect to the several sides of the film.

All these disadvantages have been avoided by my new method, and means for carrying the same into effect.

In brief, I dispose my marker on the near side of the object being photographed, i. e. between the latter and the source of X-rays, and preferably in such manner that it will always be assured that it lies in the path of the X-ray beam.

Preferably I dispose the marker within and near the margins of the compression cone. Thus the shadow projection of the marker will always be within the limits of the photograph which is taken, near the margins thereof, and its projected area will retain with respect to the photograph the same proportions that the marker bears to the internal cross-sectional area of the cone.

The marker which I employ may take the form of a spring clip fitting about the usual enlarged lip of the end of the compression cone. The clip has a marker of any desirable form, preferably but not necessarily asymmetrical, which projects slightly interiorly of the cone, and preferably at right angles to its major axis. When in the form of a clip, the marker can be readily placed where desired about the lip of the compression cone, and this only after the object to be photographed has been properly disposed on the X-ray table, if this latter technique is found to be desirable. In another modification the marker may be formed on or hinged to the compression cone, which requires a slightly greater precision in locating the object on the X-ray table. Lastly, separate marking indicia, having studs on the end thereof, may be employed, in which case either the clip is designed to receive the studs, or else the internal walls of the compression cone is recessed to receive the studs, so that any desired legend of reasonable length can be set up in the path of the X-ray beam.

Accordingly, one object of my invention is to produce a new method or technique of marking X-ray photographs for the purposes of ensuring proper orientation and interpreting thereof.

Another object is to produce a new film marker for use in X-ray photography.

Another object is to produce a new X-ray film marker characterized by its simplicity, convenience, low first cost, and ease of manipulation.

Still a further object is to produce a new film marker, disposed on the bottom of a compression cone and capable of projecting inwardly therein for a slight distance, for use in X-ray photography.

Other objects and advantages will appear hereinafter, as the disclosure of invention is developed in connection with the accompanying drawings, representing by way of example several typical and at present preferred forms of markers according to my invention.

In the drawings, Fig. 1 is a drop perspective of a source of X-rays, compression cone and marker, object to be photographed, and film pack;

Fig. 2 is a fragmentary cross section through the lower lip of the compression cone, with the preferred form of marker clipped in place thereon; while Fig. 3 is a cross-section taken on line 3—3 of Fig. 2;

Fig. 4 is a perspective of the clip itself, which has been previously shown in Figs. 1-3;

Fig. 5 is a fragmentary cross-section similar to Fig. 2, but with the marker formed integral with the lip of the compression cone, while Fig. 6 is a section on the line 6—6 of Fig. 5;

Fig. 7 is a fragmentary perspective of a constructional embodiment wherein the marker clip is hinged to the compression cone, Fig. 8 illustrating the same construction in cross-section;

Fig. 9 is a fragmentary cross-section through the bottom portion of a compression cone, having thereon a modified form of clip adapted to receive therein interchangeable characters so that various indicia can be set up therein, Fig. 10 being a cross-section through the same construction;

Fig. 11 is a view partly in perspective and partly in section, of a form of compression cone adapted to receive the tabs or studs of separate characters directly therein, without the intermediary of a clip; while Fig. 12 is a sketch suggested by an actual photograph, showing the relation of the exposed part of the film to the unexposed part, a compression cone having been employed, and the relation of the projection of the marker to the exposed part.

Referring to Fig. 1, the object 1 to be photographed is first disposed properly between the source of X-rays 2 and the film 3. At that time a marker 4 is disposed between the object 1 and the source of X-rays 2, in the path of the X-ray beam, and near the margin thereof, to indicate a particular local region of the object 1, so that upon subsequent study of the X-ray picture the observer can quickly localize the portions thereof. The indicia used is preferably, but not necessarily asymmetrical, and in those cases where a compression cone such as that shown at 5 is employed, the marker is preferably disposed near the bottom thereof, within the field of the stream of X-rays passing therethrough.

In Figs. 1-4 inclusive, the marker 4 preferably consists of an indicia portion 6, which in the instance shown takes the form of the letter R, to indicate the right hand side of the object, looking in the direction in which the X-rays pass, and a clip portion 7 adapted to fit about the usual flange 8 formed on the lip of the compression cone 5. This marker 4, or at least the clip portion 7 thereof, is preferably constructed in such manner as to have a slight resilience, so that the clip can be snapped in the proper position on the cone, after the object 1 has been properly positioned on the film 3 and the cone 5 has been adjusted into its correct position.

It is of course feasible to form the indicia portion 6 integral with the cone 5, and this has been done in the construction illustrated in Figs. 5 and 6, wherein the indicia 6 is formed integral at 9, as by casting, welding, soldering or the like, to the enlarged lip 8 of the cone 5. With this construction it is of course impossible to place the indicia in various positions about the periphery of the cone, so that greater care is required in 1, positioning the object 1 on the film 3, and 2, thereafter positioning the cone 5 over the object 1. Some latitude is provided in disposing the cone in that it can itself be rotated about its major axis in 90° increments, due to the square base plate 10 (Fig. 1) ordinarily provided at the small end thereof, and which is adapted to be received in the usual holder (not shown) for the tube 2.

In Figs. 7 and 8 a possible form of hinge construction is shown, whereby the clip 4, identical with that of Figs. 1-4, is secured by means of a hinge pintle 11 extending through the loop formed between the clip portion 7 of the marker 4 and the exteriorly projecting tab 12 thereof. The pintle 11 in the form shown comprises the yoke portion of a U-shaped bracket, the legs 13 and 14 of which are set into the exterior wall of the cone 5. Because of this construction it is possible, when it is desired to place the marker 4 out of service, simply to snap manually the clip 5 off of the lip 8, and thereby move it into the dotted line position shown in Fig. 8, in which position it will remain until it is manually forced again into its full line position of Fig. 8.

Figs. 9 and 10 illustrate a further possible construction, wherein the clip 15 is of greater length than the clip of the previous figures, the clip 15 having near the margin of its innermost longitudinal edge, two narrow, parallel and outwardly projecting (towards the longitudinal axis of the cone) ledges 16 and 17. These ledges are adapted to receive the lug portions 18 of the markers 19. By this construction any desired legend of reasonable length can be set up, to suit the individual case. Thus the name of the hospital, the date of the photograph, or the like can be photographed directly on the picture being taken. This legend, in addition to conveying such information, can also by convention indicate on the film the right and left hand portions of the object 1.

Another constructional embodiment of the idea of Figs. 9 and 10 is shown in Fig. 11, where, instead of using a clip, a nicely machined recess 20 is formed in the interior wall of the cone 5, near the bottom thereof, and preferably in the lip 8 thereof. The recess extends part way around the cone, and is adapted to receive directly the tabs 18 of the markers 19 of Figs. 9 and 10.

A typical photograph made employing my idea is shown in Fig. 12, wherein the film 3 is substantially rectangular in shape. A picture 21 of the sinus of a patient or object 1 (Fig. 1) is shown disposed centrally of the film 3, and because a compression cone 5 had been used in its taking, the margins of the exposed area are circular. At 22 is the shadow projection of the indicia portion 6 of the marker 4 of Fig. 1, and it will be noted that this shadow projection 22 is just within the exposed portion of the film.

It is obvious that once the broad features of my invention are disclosed numerous modifications, all falling within the purview of my inventive concept, will readily occur to those skilled in the art. Accordingly, I intend that my invention be limited only by the scope of the appended claims.

I claim:

1. A marker for definitely orienting on an X-ray film the respective sides of an object being photographed, comprising a resilient, substantially U-shaped clip portion, fitting about the lip of the flaring end of an X-ray compression cone, and an indicia portion, having some selected and definite shape, projecting outwardly at approximately right angles to one end of the clip portion.

2. A marker for definitely orienting on an X-ray film the respective sides of an object being photographed, comprising a resilient, substantially U-shaped clip portion, fitting about the lip of the flaring end of an X-ray compression cone, and an indicia portion, having some selected and definite shape, projecting outwardly at approximately right angles to one end of the clip portion, and a tab projecting upwardly for a short distance and then outwardly from the other end of the clip portion, to form a recess between it and the clip portion for receiving a hinge pintle.

3. X-ray photographic marking apparatus, comprising in combination, a compression cone for delimiting the path of the X-ray beam, and a marker attached to said cone and disposed near the wide end thereof and projecting for a slight distance inwardly of the cone, into the margins of the field of the X-ray beam.

4. X-ray photographic marking apparatus, comprising in combination, a compression cone for delimiting the path of the X-ray beam, and a marker clipped at an angular position on the wide end of the cone and projecting for a slight distance inwardly of the cone, into the margins of the field of the X-ray beam.

5. X-ray photographic marking apparatus, comprising in combination, a compression cone for delimiting the path of the X-ray beam, and a marker formed integrally on the cone near the wide end of the cone and projecting for a slight distance inwardly of the cone, into the margins of the field of the X-ray beam.

6. X-ray photographic marking apparatus, comprising in combination, a compression cone for delimiting the path of the X-ray beam, and a marker for definitely orienting on an X-ray film the object being photographed, comprising a resilient clip portion clipping the wide end of the cone, an indicia portion on the marker, having some selected and definite shape, projecting for a slight distance into the margin of the field of the X-ray beam which passes through the cone, and a hinge securing the marker pivotally to the compression cone so that the marker can be swung out of the field of X-rays when its use is not desired.

7. X-ray photographic marking apparatus, comprising in combination, a compression cone for delimiting the path of the X-ray beam, and a marker for definitely orienting on an X-ray film the object being photographed, comprising a resilient clip portion clipping the wide end of the cone, an indicia portion on the marker, having some selected and definite shape, projecting for a slight distance into the margins of the field of the X-ray beam which passes through the cone, a tab projecting upwardly for a short distance and then outwardly from the outer edge of the clip portion, to form a recess between it and the clip portion, and a U-shaped bracket, the legs of which are set into the exterior wall of the cone, and the yoke portion of which is received in said recess and serves as a hinge pintle, so that the marker can be swung out of the field of the X-rays when its use is not desired.

8. A marker for use in definitely orienting on an X-ray film the respective sides of an object being photographed, comprising a resilient clip portion, fitting about the lip of the flaring end of an X-ray compression cone, and an indicia-receiving portion, comprising narrow, substantially parallel ledges projecting outwardly from the inner wall of the clip portion, for receiving between them the tabs of suitable markers, so that desired legends can bet set up at will therein.

9. An X-ray compression cone for displaying markers in such manner that the shadow projection thereof will be displayed on the exposed film, photographed through the cone, in the margins of the X-ray picture, comprising a nicely machined, elongated recess disposed about the interior wall of the cone, near to and substantially parallel with the bottom edge thereof, for receiving the tabs of suitable markers, so that desired legends can be set up therein.

10. X-ray photographic marking apparatus, comprising in combination, a compression cone for delimiting the path of the X-ray beam and a marker disposed within the confines of the cone and near the wide end thereof and projecting for a slight distance inwardly of the cone, into the margins of the field of the X-ray beam.

MILTON H. PROSPERI.